United States Patent
Ina et al.

(10) Patent No.: US 8,339,051 B2
(45) Date of Patent: Dec. 25, 2012

(54) ELECTRONIC FLASH UNIT AND MANUFACTURING METHOD THEREOF

(75) Inventors: Hirohiko Ina, Hyogo (JP); Arata Sakamoto, Osaka (JP); Shohei Uno, Osaka (JP); Toshinori Maki, Hyogo (JP); Katsumi Horinishi, Wakayama (JP); Naoyuki Furutsuka, Hyogo (JP); Hajime Mitsui, Osaka (JP); Kazue Nakagawa, Kyoto (JP); Katsuji Ishikawa, Osaka (JP); Hisashi Ogura, Nara (JP); Mitsuo Fuke, Nara (JP); Katsunori Kawabata, Osaka (JP); Takashi Umehara, Osaka (JP); Katsushi Sumisaki, Osaka (JP)

(73) Assignee: Panasonic Corporation, Osaka (JP)

( * ) Notice: Subject to any disclaimer, the term of this patent is extended or adjusted under 35 U.S.C. 154(b) by 533 days.

(21) Appl. No.: 11/716,744

(22) Filed: Mar. 12, 2007

(65) Prior Publication Data

US 2007/0170869 A1   Jul. 26, 2007

Related U.S. Application Data

(62) Division of application No. 10/497,025, filed as application No. PCT/JP02/12430 on Nov. 28, 2002, now Pat. No. 7,652,434.

(30) Foreign Application Priority Data

Nov. 30, 2001   (JP) .................................. 2001-365882

(51) Int. Cl.
*H05B 39/09* (2006.01)
(52) U.S. Cl. .................................................. 315/200 A
(58) Field of Classification Search ............... 315/200 A, 315/212, 214, 215, 216, 217, 223, 227 R
See application file for complete search history.

(56) References Cited

U.S. PATENT DOCUMENTS

| | | | |
|---|---|---|---|
| 3,596,237 A | | 7/1971 | Barber et al. |
| 3,612,850 A | * | 10/1971 | Nijland et al. .................. 362/10 |
| 3,737,651 A | | 6/1973 | Shute |
| 3,952,190 A | * | 4/1976 | Perkins ............................ 362/4 |
| 4,255,691 A | * | 3/1981 | Inagaki et al. .............. 315/241 P |
| 4,486,691 A | * | 12/1984 | Beggs ......................... 315/241 P |

(Continued)

FOREIGN PATENT DOCUMENTS

EP   0 505 947 A2   9/1992

(Continued)

OTHER PUBLICATIONS

European Search Report issued in European Patent Application No. EP 02 78 5965, mailed Jun. 8, 2007.

(Continued)

*Primary Examiner* — Minh D A
(74) *Attorney, Agent, or Firm* — McDermott Will & Emery LLP

(57) ABSTRACT

The electronic flash unit disclosed comprises: a transformer (14) to vary voltages of a power supply; an accumulator (16) composed of a main capacitor (17) to charge an electric energy supplied from the transformer (14); a lamp unit (4) provided with a flashlamp (20), set inside of a reflector (19), that flashes by discharging of energy storages in the main capacitor (17) upon applying a voltage on a trigger terminal (21); and a trigger circuit (10) to generate the voltage to apply on the trigger terminal (21), wherein at least the lamp unit (4) is coated with an insulation material.

9 Claims, 7 Drawing Sheets

U.S. PATENT DOCUMENTS

| | | | |
|---|---|---|---|
| 4,918,521 A | 4/1990 | Yabe et al. | |
| 5,089,895 A * | 2/1992 | Fraker et al. | 348/373 |
| 5,172,031 A * | 12/1992 | Matsui et al. | 315/129 |
| 5,459,442 A * | 10/1995 | James | 333/156 |
| 5,678,162 A * | 10/1997 | Barlow et al. | 419/2 |
| 6,264,378 B1 * | 7/2001 | Katoh et al. | 396/348 |
| 6,304,232 B1 * | 10/2001 | Brown et al. | 343/895 |
| 6,366,737 B1 * | 4/2002 | Numako et al. | 396/180 |
| 6,453,145 B1 * | 9/2002 | Miura | 399/336 |
| 6,466,741 B2 * | 10/2002 | Uchiyama | 396/6 |
| 6,652,795 B2 | 11/2003 | Konishi et al. | |
| 2002/0047613 A1 * | 4/2002 | Shimazu et al. | 315/246 |

FOREIGN PATENT DOCUMENTS

| | | |
|---|---|---|
| EP | 0 589 569 A1 | 3/1994 |
| JP | 7-28139 | 1/1995 |
| JP | 08-240840 | 9/1996 |
| JP | 8-240840 | 9/1996 |
| JP | 10-70793 | 3/1998 |
| JP | 10-239739 | 9/1998 |
| JP | 10-312010 | 11/1998 |
| JP | 11-61056 | 3/1999 |
| JP | 11-061056 | 3/1999 |
| JP | 11-271933 | 10/1999 |
| JP | 2000-241856 | 9/2000 |

OTHER PUBLICATIONS

European Office Action issued in European Patent Application No. EP 02785965.1 dated Mar. 10, 2011.

Extended European Search Report, issued in European Patent Application No. 11 166 928.9, dated Oct. 20, 2011.

United States Office Action issued in U.S. Appl. No. 10/497,025 dated Jul. 20, 2009.

* cited by examiner

ELECTRONIC FLASH UNIT AND MANUFACTURING METHOD THEREOF

RELATED APPLICATIONS

This application is a divisional of application Ser. No. 10/497,025, filed on May 28, 2004, now U.S. Pat. No. 7,652,434, which in turn claims the benefit of PCT/JP02/12430, filed on Nov. 28, 2002, which in turn claims benefit of Japanese Patent Application No. 2001-365882, filed on Nov. 30, 2001, the disclosures of which Applications are incorporated by reference herein.

TECHNICAL FIELD

The present invention relates to an electronic flash unit employing a flashlamp, a valuable artificial light source, to take photographs using camera (an imaging apparatus) equipped with a silver film or an electronic imaging element such as charge-coupled device (CCD) or complementary metal-oxide semiconductor (CMOS) sensor as a photographic sensitive material, and a manufacturing method thereof.

BACKGROUND ART

FIG. 7 shows a typical electronic flash unit basically comprising: flashlamp 20 for instance a xenon lamp (set inside of a reflector, but not shown); lamp unit 4 provided with trigger terminal 21; trigger circuit 10 provided with trigger coil 11 and trigger capacitor 13; transformer 14 composed of transformer coil 15; accumulator 16 composed of main capacitor 17; and power source 22 composed of DC source 23. Main capacitor 17, on a charged condition of for instance 300 V by DC source 23, allows trigger circuit 10 to apply a several kV of trigger voltage on trigger terminal 21 of flashlamp 20, thereby causing flashlamp 20 to ignite for flashing by discharging the power storage in main capacitor 17.

Other types of electronic flash units would have dimming circuits 25 provided with Insulated Gate Bipolar Transistor (IGBT) 26, optical sensor 27 or the like added to the aforesaid configuration to control the amount of flashing light by dimming circuits 25.

A lot of conventional electronic flash units like described above are used in various kinds of cameras such as silver film cameras, well known digital cameras employing CCD or CMOS sensor as an imaging element, and single-use-cameras having a simplified structure of a film incorporated with a lens unit and the electronic flash unit built-in the camera body.

As portable telecommunication terminals or cell-phones capable of transmitting stored images using built-in digital camera have become popular in the market, electronic flash units detachable to the cell-phones have also begun to be provided. Along with recent trends of downsizing in cameras and cell-phones, or built-in design in cell-phones, a more compact sized electronic flash units are required to meet the market needs.

Downsizing of the electronic flash unit, however, cannot be achieved without solving the problem of so-called "trigger leak". The trigger leak means a poor flashing due to occurring a creeping discharge that results in an ineffective ionization in flashlamp 20 caused by a decrease in clearance between trigger terminal 21 provided on the glass bulb of flashlamp 20 and main electrode 20a of flashlamp 20.

SUMMARY OF THE INVENTION

The electronic flash unit comprises: a transformer to vary voltages of a power supply; an accumulator composed of a main capacitor to charge an electric energy supplied from the transformer; a lamp unit provided with a flashlamp, set in a reflector, that flashes by discharging the electric energy storage in the main capacitor upon applying a voltage on a trigger terminal; and a trigger circuit to generate the voltage to apply on the trigger terminal, wherein at least the lamp unit is coated with an insulation material.

DETAILED DESCRIPTION OF PREFERRED EMBODIMENTS

Now, the preferred embodiments of the present invention are described with reference to the drawings.
(Preferred Embodiment 1)

Figure 1:
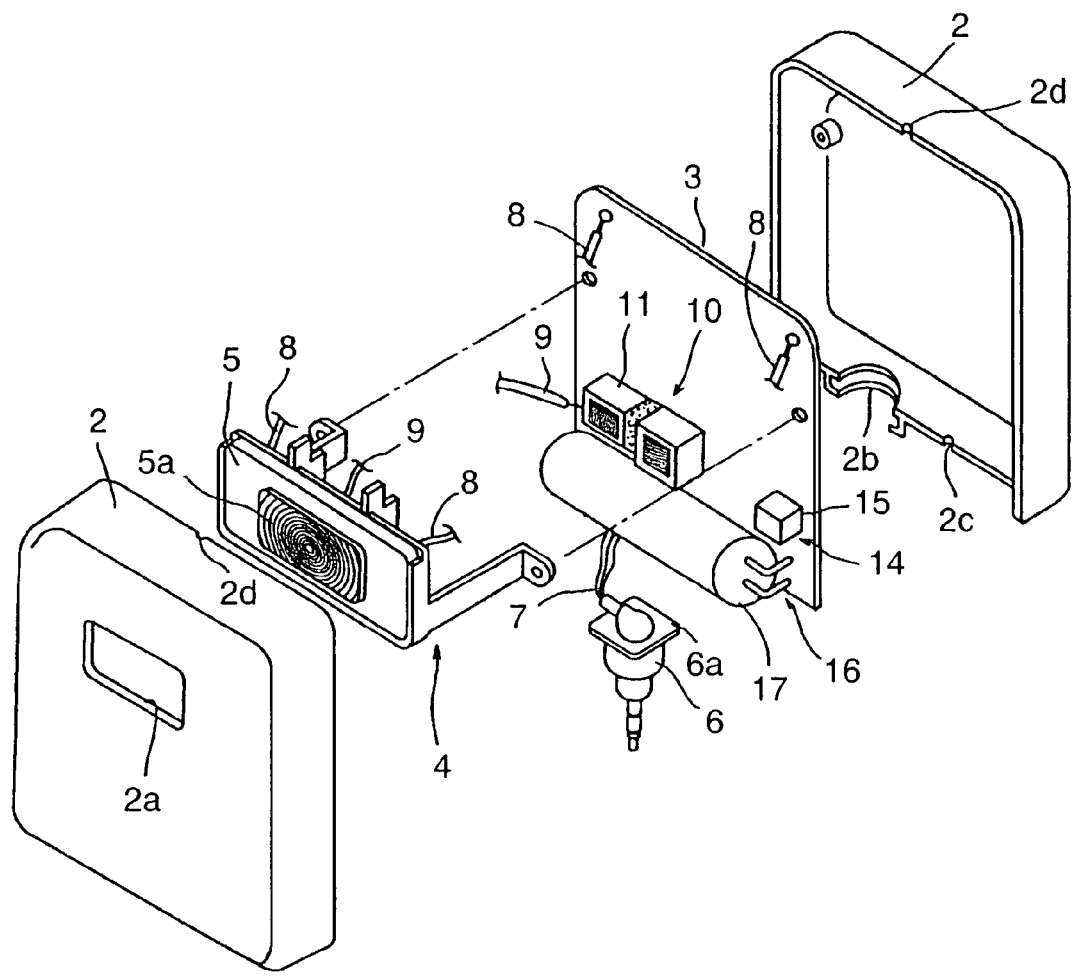
FIG. 1 shows an exploded perspective view from the front side of the electronic flash unit used in preferred embodiment 1 of the present invention.

FIG. 1 shows an example of electronic flash units in which lamp unit 4, trigger circuit 10, transformer 14, dimming circuit 25 and accumulator 16 are shown coated with an insulation material individually.

The electronic flash unit explained in preferred embodiment 1, capable of connecting to an earphone jack of a cell-phone having built-in digital camera using CCD or CMOS sensor detachable freely, flashes upon receiving power supply and signals to start photographing from the cell-phone. As shown in FIG. 1, the electronic flash unit includes elements of: circuit board 3; lamp unit 4 except optical surface 5a, exposed critically through opening 2a formed in the front half of housing 2, of optical panel 5; and base 6a of plug (external terminal) 6 in a hermetically sealed generally box shaped resin molded housing 2 capable of separating into halves.

Circuit board 3 has patterned circuits to drive the electronic flash unit. The pattern in circuit board 3 comprises circuit elements connected electrically: various kinds of lead wires such as lead wire 7 to the plug, lead wire 8 to flashlamp 20, and lead wire 9 to trigger terminal 21; trigger circuit 10 including trigger coil 11, trigger capacitor 13 (not shown) or the like; dimming circuit 25 including IGBT (not shown), optical sensor (not shown) or the like; transformer 14 composed of transformer coil 15; and accumulator 16 composed of main capacitor 17.

Figure 2:
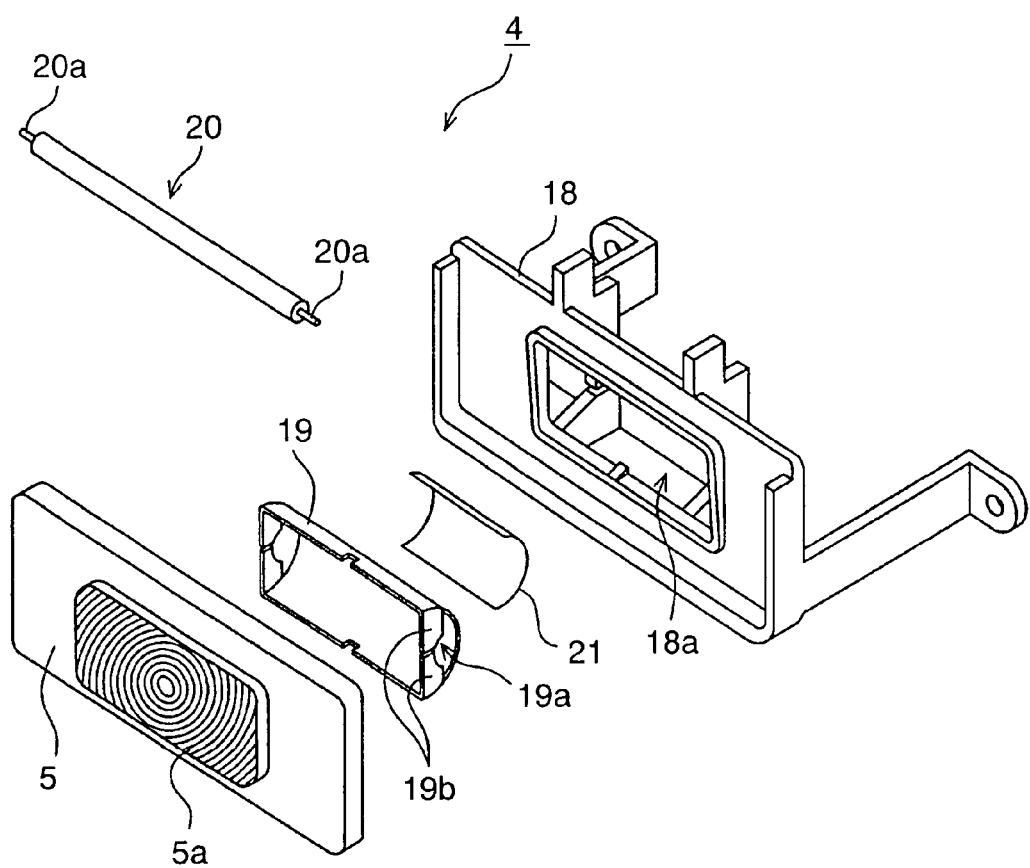
FIG. 2 shows an exploded perspective view from the front side of the lamp unit used in preferred embodiment 1 of the present invention.
Figure 3:
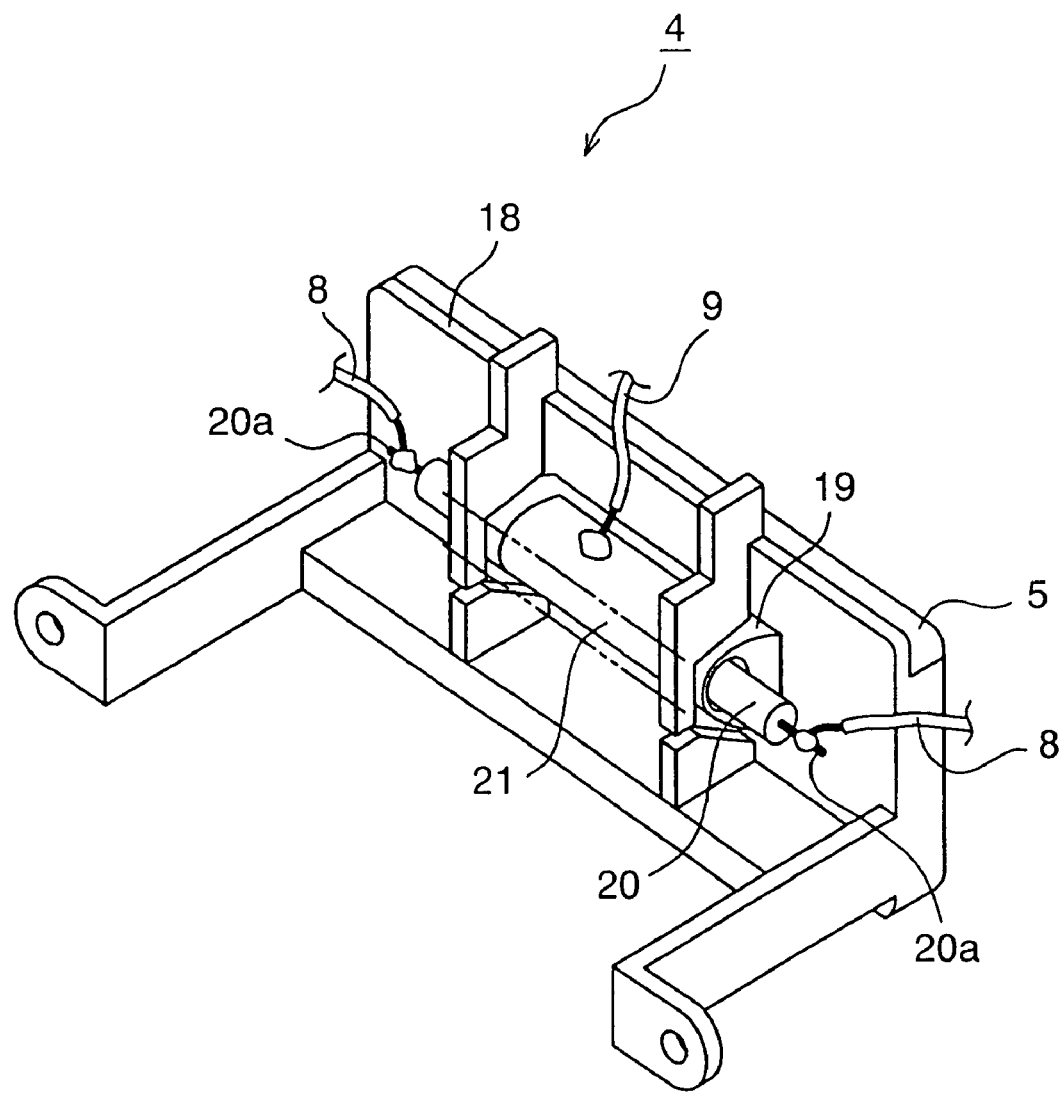
FIG. 3 shows a perspective view from the backside of the lamp unit used in preferred embodiment 1 of the present invention.

Lamp unit 4, other than aforesaid optical panel 5, comprises: resin molded frame 18 fixed to circuit board 3; reflector 19; flashlamp 20 provided with a conductive layer, for instance a transparent conductive layer, formed on the outer surface of glass bulb; and trigger terminal 21 connected electrically to the conductive layer formed on the glass bulb of flashlamp 20 through reflector 19 as shown in FIGS. 2 and 3.

Reflector 19 is fitted to opening 18a of frame 18 from the front. Flashlamp 20 is inserted inside of reflector 19 from side openings 19a of reflector 19 projecting to the back of opening 18a of frame 18. A pair of lead wires 8 to flashlamp 20 is soldered to each of main electrodes 20a of flashlamp 20 respectively. A lead wire 9 to trigger terminal 21 is soldered to trigger terminal 21 appressed to the back of reflector 19. Optical panel 5 is fitted to the front surface of frame 18, or optical panel 5, in a condition of being fitted to opening 2a of housing 2, is included in housing 2 eventually.

Reflector 19 is made of a bright aluminum sheet cut into a predetermined shape, formed into generally U-shaped and bent inward in edges, comprising a U-shaped cross-sectional or concavely curved inner surface to reflect a flash light and a pair of side panels, 19b and 19b, in both right and left ends.

A pair of side panels 19b are designed to provide side opening 19a with a slightly larger dimension than the outer diameter of flashlamp 20, causing both ends (including main electrodes 20a) of flashlamp inserted from a side opening 19a to project out of side openings 19a externally.

Flashlamp 20 has a structure of a straight glass tube with metal rod main electrodes 20a sealed in both ends, partially extending externally along axial direction, and with a filling gas in the tube of for instance xenon.

One of main electrodes 20a of flashlamp 20 is connected to lead wire 8 connected to main capacitor 17 and another main electrode 20a is connected for instance to lead wire 8 grounded directly.

Trigger terminal 21 is made of a copper sheet bent arc shaped corresponding to reflector 19. Practically, the copper sheet, reflector 19 and the conductive layer provided on the glass bulb of flashlamp 20 all together make up trigger terminal 21. The copper sheet, however, is not necessary if lead wire 9 to trigger terminal 21 can be soldered directly to reflector 19 or to the surface of glass bulb of flashlamp 20.

Figure 4:
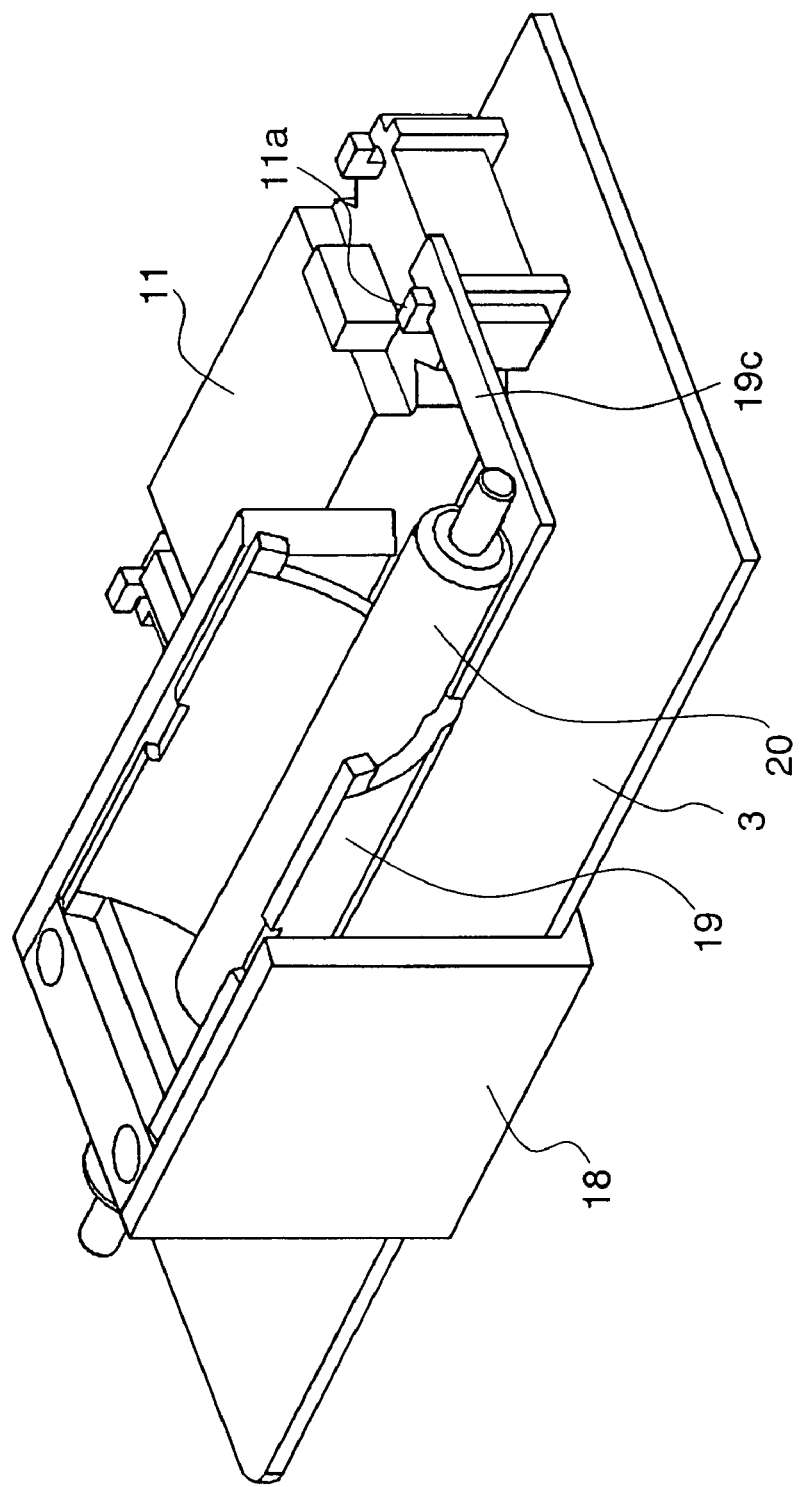
FIG. 4 shows a partial perspective view of a different embodiment of the lamp unit used in preferred embodiment 1 of the present invention.

Extending reflector 19 partially to act as a terminal, portion 19c can be coupled directly with high voltage terminal 11a of trigger coil 11 as shown in FIG. 4. The configuration can not only make lead wire 9 to trigger terminal and the copper sheet unnecessary but also can save works of pasting the copper sheet or soldering lead wire 9 to trigger terminal 21.

As aforementioned and shown in FIG. 1, housing 2 contains; circuit board 3 including various circuit elements, lamp unit 4 and base 6a of plug (external terminal) 6 in a hermetically sealed condition.

Though the relevant positions are sealed hermetically in fitting optical surface 5a of optical panel 5 to opening 2a of housing 2 and in fitting plug base 6a of plug 6 to opening 2b provided at separate surfaces of the housing halves, housing 2 is not sealed in a complete air-tight condition.

The reason is that housing 2 is provided with a pair of fine through holes 2c and 2d. Through holes 2c and 2d are formed halved at the separate surfaces of housing 2 to form circular holes by combining halves of housing 2. The positions to provide through holes 2c and 2d are not restricted particularly. Among these two, through hole 2c is to work for filling housing 2 with an insulation resin (insulation material), and the other through hole 2d is to let air in housing 2 out at the resin filling. Specifically, housing 2 is filled with the insulation resin using a filling nozzle fitted in through hole 2c formed at the bottom surface of housing 2, allowing air in housing 2 to leave via through hole 2d formed at the top surface of housing 2.

Number of hole is not restricted within one pair if the resin filling and air releasing will be performed well, and hole other than circular shaped may be acceptable. Polyurethane, silicone, epoxy, polyimide or the like can be adopted for the insulation resin, and glasses may be used as insulation materials.

A feasible configuration has a reflector filled with an insulation material internally if a glass or resin, transparent or translucent, with insulation property is adopted as the insulation material. In this case, the internal of reflector as well as lamp unit is filled with the glass or resin for insulation at the same time. The glass or resin, transparent or translucent, can effectively prevent a loss in incident light intensity of flashlamp through the air atmosphere inside of the reflector to optical panel that occurs when the glass or resin is not applied, enabling to increase in performance characteristics of the electronic flash unit.

Additionally, the resins can be mixed with glass beads to improve light diffusion effects.

Figure 5:
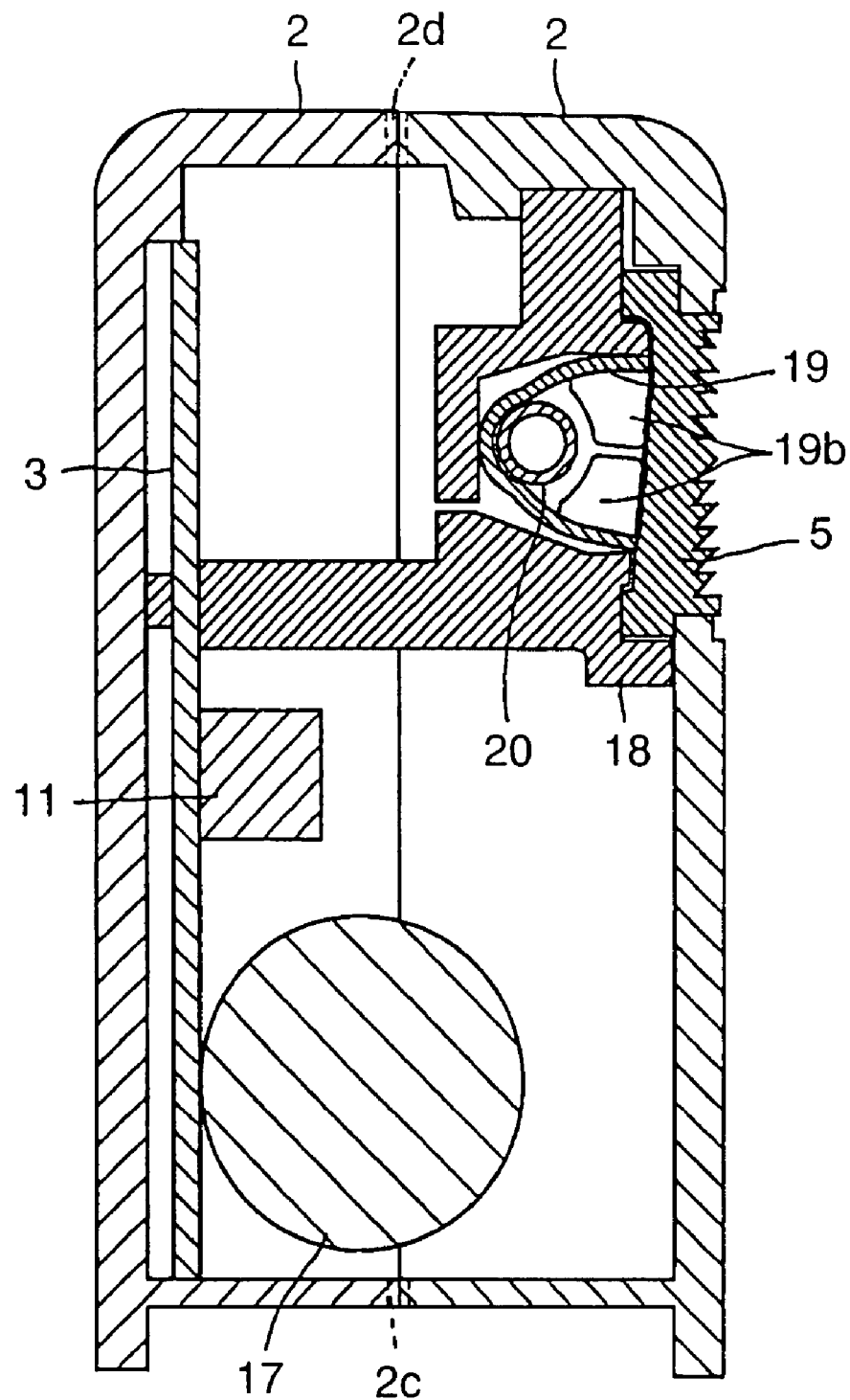
FIG. 5 shows a cross-sectional side view of the electronic flash unit used in preferred embodiment 1 of the present invention.

As described above, the electronic flash unit elements consisting of circuit board 3 (including trigger circuit 10, transformer 10, accumulator 16, dimming circuit 25 or the like) and lamp unit 4 are all allowed completely coated with the resin, since the sealed inside space of housing 2 is filled with a resin entirely as shown in FIG. 5 (housing 2 under a condition filled with a resin is not shown). Above all, positions required highly insulated such as the clearance between main electrodes 20a and 20a of flashlamp 20 and trigger terminal 21 (reflector 19), terminals 11a of trigger coil 11, transformer coil 15 (especially, secondary coil) and terminals of main capacitor 17 (especially, high voltage terminal) are electrically insulated completely, enabling to prevent the trigger leak or possible electric shocks at breakage of housing 2 from occurring. Additionally, the configuration can improve their own insulation characteristics of trigger coil 11 and transformer coil 15 and can strengthen resistances to dropping impacts or the like.

(Preferred Embodiment 2)

Figure 6A:
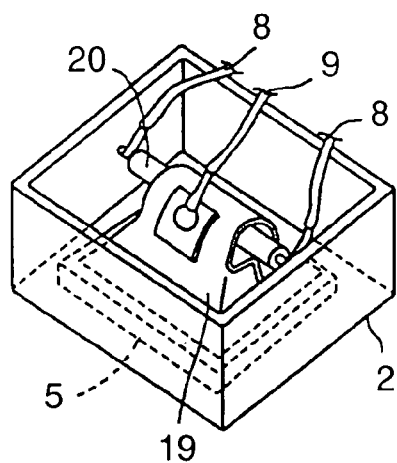
FIG. 6A shows a perspective view from the backside of the electronic flash unit used in preferred embodiment 2 of the present invention.
Figure 7:
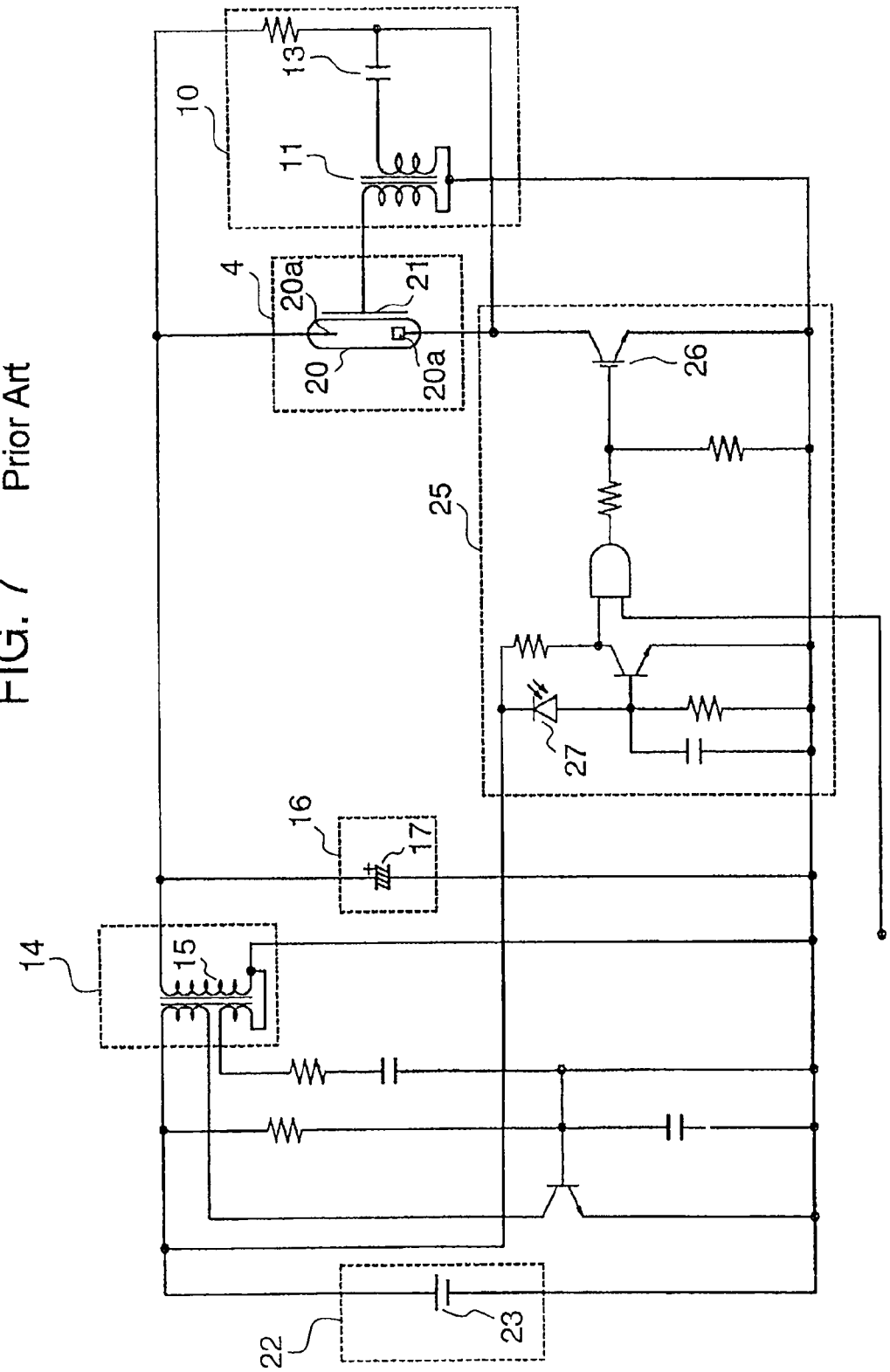
FIG. 7 shows an electric block diagram of a typical electronic flash unit.

FIG. 6A shows an example of lamp unit 4 in FIG. 7 coated with an insulation material.

The electronic flash unit used in preferred embodiment 2 includes lamp unit 4 alone in housing 2 independently as shown in FIG. 6A. The configuration is suitable for a detachable lamp unit to an electronic flash unit (or a camera body or cell-phone body, in case of a camera or cell-phone with a built-in electronic flash unit).

Box-shaped housing 2, provided with optical panel 5 in one surface and open in the opposite surface, includes reflector 19, flashlamp 20 and trigger terminal 21.

Housing 2 includes a pair of lead wires 8 and 8 to flashlamp 20, and lead wire 9 to trigger terminal including soldered ends.

Housing 2 is filled with an insulation resin under this condition.

Consequently, the clearances between main electrodes 20a and 20a of flashlamp 20 and trigger terminal 21 (reflector 19) are electrically insulated completely, enabling to prevent the trigger leak or possible electric shocks at breakage of housing 2 from occurring and to strengthen resistances to dropping impacts or the like.

(Preferred Embodiment 3)

Figure 6B:
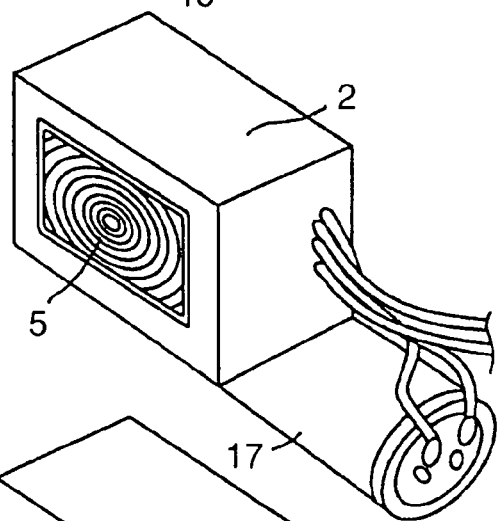
FIG. 6B shows a perspective view from the front side of the electronic flash unit used in preferred embodiment 3 of the present invention.

FIG. 6B shows an example of lamp unit 4, trigger circuit 10, transformer 14 and dimming circuit 25 in FIG. 7 coated with an insulation material. The electronic flash unit used in preferred embodiment 3 includes lamp unit 4 and circuit board 3 in an independent housing 2, exposing main capacitor 17 out of housing 2 as shown in FIG. 6A.

Box-shaped housing 2 provided with optical panel 5 in one surface, includes reflector 19, flashlamp 20, trigger terminal 21 and circuit board 3 carrying circuit elements (trigger circuit 10, transformer 14, dimming circuit 25 or the like) except main capacitor 17.

Lead wires connected to terminals of main capacitor 17 and lead wires to receive electric power or signals externally are connected to internal circuit board 3 through housing 2.

Housing 2 is filled with an insulation material under this condition. Consequently, the clearances between main electrodes 20a and 20a of flashlamp 20 and trigger terminal 21 (reflector 19), terminals 11a of trigger coil 11 and transformer coil 15 are electrically insulated completely, enabling to prevent the trigger leak or possible electric shocks at breakage of housing 2 from occurring and to strengthen resistances to dropping impacts or the like.

(Preferred Embodiment 4)

Figure 6C:
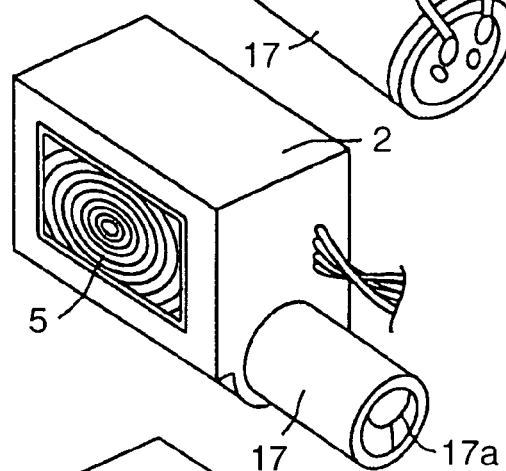
FIG. 6C shows a perspective view from the front side of the electronic flash unit used in preferred embodiment 4 of the present invention.

FIG. 6C shows an example of lamp unit 4, trigger circuit 10, transformer 14, dimming circuit 25 and a terminal of main capacitor 17 in FIG. 7 coated with an insulation material.

The electronic flash unit used in preferred embodiment 4 includes lamp unit 4, circuit board 3 and a portion of main capacitor 17 in an independent housing 2, exposing the other portion of main capacitor 17 (except terminal) out of housing 2 as shown in FIG. 6C.

Box-shaped housing 2 provided with optical panel 5 in one surface, includes reflector 19, flashlamp 20, trigger terminal 21 and circuit board 3 carrying circuit elements (trigger circuit 10, transformer 14, dimming circuit 25, accumulator 16 or the like).

Housing 2 includes terminal side half of main capacitor 17 while the other half of explosion-protection valve side is exposed out of housing 2 critically. Lead wires to receive electric power or signals externally are connected to internal circuit board 3 through housing 2.

Housing 2 is filled with an insulation material under this condition. Consequently, the clearances between main electrodes 20a and 20a of flashlamp 20 and trigger terminal 21 (reflector 19), terminals 11a of trigger coil 11, transformer coil 15 and terminal of main capacitor 17 are electrically insulated completely, enabling to prevent the trigger leak or possible electric shocks at breakage of housing 2 from occurring and to strengthen resistances to dropping impacts or the like.

Explosion-protection valve 17a provided in main capacitor 17 is to protect whole of the capacitor from breakage by blowing out itself at an abnormal increase in inner pressure of main capacitor 17. The valve is introduced on the assumption of possible failures. Though, typically, it seems unlikely for explosion-protection valve 17a to blow out, it would be a wise measure to expose a relevant portion out of housing 2 beforehand to protect housing 2 from damaging influences if possible failures are assumed.

Therefore, housing 2 is not influenced even in an abnormal condition (over current) of main capacitor 17, as explosion-protection valve 17a is positioned exposed outside of housing 2.

(Preferred Embodiment 5)

Figure 6D:
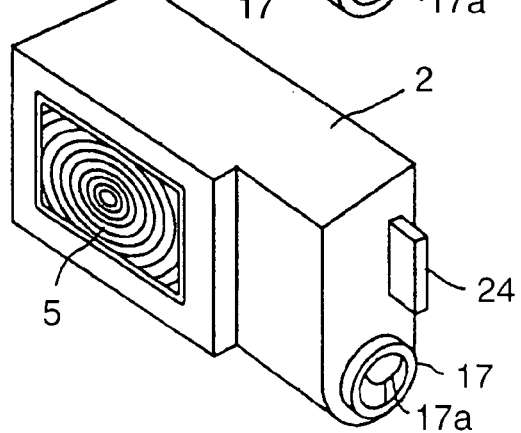
FIG. 6D shows a perspective view from the front side of the electronic flash unit used in preferred embodiment 5 of the present invention.

FIG. 6D is an example showing lamp unit 4, trigger circuit 10, transformer 14, dimming circuit 25 and a terminal of main capacitor 17 in FIG. 7 are coated with an insulation material.

The electronic flash unit used in preferred embodiment 5 includes lamp unit 4, circuit board 3 and a portion of main capacitor 17 in an independent housing 2, exposing the other portion of main capacitor 17 (except terminal) and projection terminal 24 to receive electric power and signals externally from housing 2 as shown in FIG. 6D.

A feasible configuration further comprises a projection terminal to connect to the power supply electrically that protrudes out of the housing. Namely, the electronic flash unit can be a detachable device if camera or cell-phone has a terminal capable of connecting to the projection terminal Box-shaped housing 2 provided with optical panel 5 in one surface, includes reflector 19, flashlamp 20, trigger terminal 21 and circuit board 3 carrying circuit elements (trigger circuit 10, transformer 14, dimming circuit 25, accumulator 16 or the like). Housing 2 includes most of terminal side of main capacitor 17 while the remaining side with explosion-protection valve 17a is exposed out of housing 2. Projection terminal 24 exposing out of housing 2 critically is connected to circuit board 3 through inside of housing 2 or an end of circuit board exposed out of housing 2 critically acts as a projection terminal.

Housing 2 is filled with an insulation material under this condition. Consequently, the clearances between main electrodes 20a and 20a of flashlamp 20 and trigger terminal 21 (reflector 19), terminals 11a of trigger coil 11, transformer coil 15 and terminal of main capacitor 17 are electrically insulated completely, enabling to prevent the trigger leak or possible electric shocks at breakage of housing 2 from occurring and to strengthen resistances to dropping impacts or the like.

Other Preferred Embodiments

The present invention is not so limited to the aforesaid preferred embodiments but is susceptible to various changes without departing from the scope of the invention.

For instance, if the housing is used as a package of the electronic flash unit (including a case when the housing is used for an element of the electronic flash unit for instance lamp unit 4 alone), the housing can be applied a conductivity to perform protective shield effects against electric or magnetic noises. The housing should, preferably, be filled with an insulation resin after inner (or outer) surface of the housing is provided with a shield layer by conductive resin coating or metal plating.

The configuration of housing with the shield layer can shut off electric noises properly.

Additionally, the description, "internal elements are hermetically sealed in the housing", does not mean to shut off in-and-out air flowing completely but means not to leak out the filled resin. Therefore, in all of the aforementioned descriptions, housing 2 does not require a high accuracy as to secure a perfect airtight condition. However, to reduce inward and outward air flowing paths, optical panel 5 should preferably be made integrally with housing 2 using a same material. Consequently, optical panel 5 is not required to form an attachable periphery to housing 2 or housing 2 does not need to have an opening provided with a frame mountable to optical panel 5, resulting in a contribution to the downsizing of electronic flash unit due to thin thickness optical panel 5 and compact sized housing 2.

Additionally, if the configuration of optical panel 5 molded integrally with housing 2 is adopted instead of disposed in front of the opening of reflector 19 as a separate parts, low profile optical panel 5 and down sized housing 2 can be achieved, resulting in a downsizing of the electronic flash unit. Moreover, the configuration can provide a high quality electronic flash unit, with no danger of leaking the filled insulation materials out of the electronic flash unit as no joint surfaces exist between optical panel 5 and housing 2.

Additionally, the applying way of insulation resins are not so limited to the insulation resins poured into the housing through holes or the like externally. A feasible method for instance would be to provide respective halves of a housing with the insulation resin beforehand and to complete a housing by combining the respective halves.

Additionally, the filling insulation resin should preferably have a certain degree of elasticity. This is to prevent the housing or parts included in the housing from being damaged due to an expansion of insulation materials caused by heats generated in elements of the electronic flash unit.

Moreover, to prevent air bubbles from generating in the insulation materials, the housing is allowed pumped to a vacuum pressure during or after the resin filling and then the insulation resins should preferably be hardened under a pressure higher than the vacuum pressure.

Additionally, the aforesaid resin filling process pumps air in the reflector also, causing to fill inside of the reflector with the resin. However, the resin can be prevented from pouring inside of the reflector, if gaps between side openings of the reflector and the flashlamp, and between both side plates are sealed by some sealing means (for instance, a silicone bond or a rubber bushing). (No insulation resin pours into from the front opening, as the optical panel closes the opening).

Additionally, the reflector filled with the insulation resin has an advantage to prevent a loss in incident light through the air atmosphere inside of the reflector to optical panel resulting in no decrease in light intensity (in case of a transparent insulation resin), but has a disadvantage to reduce light diffusion effects of a light diffusion surface formed on the back surface of the optical panel due to the approximate refraction factors of the optical panel and the insulation resin.

The configuration of the reflector filled with the insulation resin, therefore, should preferably adopt an insulation resin mixed with a diffusion agent as an additive, and glass beads for instance used as a diffusion agent will improve the light diffusion effects.

Moreover, instead of the housing used as a mold to fill with the insulation resin as described in the aforesaid preferred embodiments, a possibility would be the electronic flash unit regardless of the housing (covered by a housing if needed), wherein elements of the electronic flash unit (all of or a part of) are set in another mold and released from the mold after the mold is filled with the insulation resin.

Additionally, to produce the electronic flash unit contained in the housing filled with the insulation resin, internal elements of the electronic flash unit are disposed after selected into two groups: high voltage group to be insulated (for instance, the lamp unit, the trigger circuit, at least secondary terminal of the transformer, at least high voltage terminal of the main capacitor or the like); and the remaining low voltage group.

If filled-in insulation resins are hardened disposing elements in high voltage group on lower positions and elements in low voltage group on upper positions in the housing, the elements in high voltage group can be insulated properly as the elements in high voltage group is securely covered in the insulation resin even in up and down flowing movements in upper portions of the insulation resin caused by bubbling under a vacuum condition in case of the housing filled with the insulation resin incompletely.

Moreover, members such as lamp unit 4 or the like to be filled with insulation materials should preferably be filled with the insulation materials once coating the surface with the insulation resin by dipping or the like. This is to achieve an effective insulation coating as gaps in each parts are filled with the insulation resin reliably.

As described above, among elements of the electronic flash unit disclosed in the present invention at least lamp unit is coated with the insulation resin to insulate the clearance between the trigger terminal (or reflector itself, or the reflector attached to the trigger terminal), enabling to prevent the trigger leak from occurring properly. Consequently, a further downsizing of the electronic flash unit can be achieved by solving the trigger leak problem.

Industrial Applicability

The present invention relates to an electronic flash unit using a flashlamp as a light source and a manufacturing method thereof. The electronic flash unit can prevent the occurrence of the trigger leaks accompanied by downsizing significantly, while achieving a compact design.

REFERENCE MARKS IN THE DRAWINGS 1 electronic flash unit
2 housing
2c through hole (resin filling)
2d through hole (venting)
3 circuit board
4 lamp unit
5 optical panel
6 plug (external terminal)
10 trigger circuit
11 trigger coil
13 trigger capacitor
14 transformer
15 transformer coil
16 accumulator
17 main capacitor
17a explosion-protection valve
19 reflector
20 flashlamp
20a main electrode
21 trigger terminal
22 power source
23 DC source
24 projection terminal
25 dimming circuit
26 Insulated Gate Bipolar Transistor (IGBT)
27 optical sensor

The invention claimed is:

1. A manufacturing method of an electronic flash unit, the unit comprising:
a housing having a first hole, a second hole, and an opening;
a transformer to vary voltages of a power supply;
an accumulator composed of a main capacitor to charge an electric energy supplied from the transformer;
a lamp unit provided with a flashlamp, set inside of a reflector, that flashes by discharging of energy storages in the main capacitor by a voltage applied on a trigger terminal; and
a trigger circuit to generate voltages to apply on the trigger terminal, the method comprising steps of:

filling the housing, as a mold, with an insulation material in a condition such that at least the lamp unit is disposed in the housing and fitted to the opening to seal the opening; and coating at least the lamp unit with the insulation material by hardening the insulation material, wherein:

the insulation material is supplied into the mold from the first hole as an input hole, and air in the mold is exhausted from the mold through the second hole as a vent hole while the insulation material is filled into the mold so as not to leave a space in the mold.

2. The manufacturing method of claim 1, further comprising:

disposing the reflector with gaps thereof closed so that the reflector is not filled with the material.

3. The manufacturing method of one of claims 1 and 2, further comprising:

placing the mold in a vacuum atmosphere during the insulation material filling or just after the insulation material filling, and placing the mold in an atmosphere with a pressure higher than the vacuum pressure during the insulation material hardening.

4. The manufacturing method of one of claims 1 and 2, further comprising:

before filling the mold with the insulation material, dividing elements of the electronic flash unit into a high voltage group and a low voltage group, and placing the low voltage group above the high voltage group in the mold, wherein the insulation material is filled into the mold while the low voltage group is placed above the high voltage group.

5. The manufacturing method of one of claims 1 and 2, further comprising:

before filling the mold with the insulation material, coating surfaces of elements to be coated for insulation with the insulation material with the insulation material.

6. The manufacturing method of claim 1, wherein:

the insulation material is filled so that at least the lamp unit is completely insulated by the insulation material after positioning the lamp unit in the mold.

7. The manufacturing method of claim 6, wherein:

the lamp unit has connecting terminals, and the connecting terminals are completely embedded in the insulation material.

8. The manufacturing method of claim 1, further comprising hermetically sealing the housing before the step of filling.

9. The manufacturing method of claim 1, wherein the housing is capable of separating into halves of a front half and a back half, and is generally box shaped;

wherein the housing is provided with the opening formed in the front half of the housing;

wherein the lamp unit is fixed by a resin molded frame;

wherein the lamp unit is further provided with an optical surface; and wherein the optical surface is exposed through the opening.

* * * * *